Feb. 24, 1931.  J. T. BALDWIN  1,793,667
FLOOR COVERING AND PROCESS OF PREPARING THE SAME
Original Filed Jan. 8, 1927
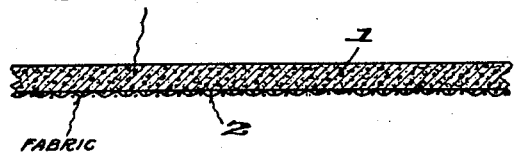
Inventor
Julian T. Baldwin
By Prentiss, Stone & Boyden
Attorneys.

Patented Feb. 24, 1931

1,793,667

UNITED STATES PATENT OFFICE

JULIAN T. BALDWIN, OF WEST CHESTER, PENNSYLVANIA, ASSIGNOR TO SANDURA COMPANY, INC., OF PHILADELPHIA, PENNSYLVANIA, A CORPORATION OF NEW JERSEY

FLOOR COVERING AND PROCESS OF PREPARING THE SAME

Application filed January 8, 1927, Serial No. 159,918. Renewed May 16, 1930.

This invention relates to an improvement in floor coverings and to a process for making the same.

The present invention is a substitute for linoleum. In place of the oils and gums now used for the binding medium which holds the cork and wood floor together, it is proposed to use a composition which has certain advantages. For example, the proposed binding agent makes it possible to manufacture a floor covering in twenty-four hours or less whereas to make the present linoleums, it requires much longer periods, sometimes as long as six months, three months to oxidize the oil by the "scrim" process and three months to "cure" the manufactured linoleum. Even for the light grades of linoleum, several weeks are required.

The binding agent employed in the floor covering of the present invention is a so-called resin-plasticizer composition, the details of which are described and claimed in my copending application Serial No. 138,897, filed October 1, 1926, and consists generally of resinous substances, plasticizers, and optionally modifiers. Such a composition is more flexible, tougher, more durable, and less permeable than linoleum. It is more resistant to the soaps and alkalies used for cleaning than is the common linoleum, since the latter contains vegetable oils that are saponifiable and subject to attack.

The resins employed may be either natural or synthetic, examples of which are acroides gum, rosin, Manila, copal, shellac, cumaron, ester gum, urea formaldehyde resins, and the like. It is to be understood that by resin is meant a true resin as technically distinguished from a gum. A true resin, for instance, is insoluble in water, whereas a gum is soluble in water.

Plasticizers are substances or mixtures of substances which apparently form a permanent gel or state of solution with resins. When a plasticizer is mixed with a resin, the resulting composition is generally considered to be a solution of the resin in the plasticizer, the plasticizer being the external phase. It is desirable in the present case to have the plasticizer as the internal phase or in solution in the resin. The solution is probably not a true solution but a gel or a dispersion of plasticizer in the resin.

Plasticizers are generally liquid and have practically no vapor pressure at ordinary temperatures (70° F.). They are high boiling point solvents for resins, their boiling points ranging not much below 300° C.; they are chemically stable; free from tackiness; and impart to the resins the important properties of flexibility, toughness, impermeability, durability and smoothness of surface. Examples of plasticizers are: diethyl phthalate, dibutyl phthalate, diamyl phthalate, dibutyl tartrate, triphenyl phosphate, and tricresyl phosphate.

Modifiers are used optionally to attain certain desired qualities such as hardness, elasticity, cheapness, and impermeability. Modifiers are distinguished from the body ingredients in that they are a part of the gel or binding medium and are not merely bound by the gel. Similar substances may be used both as modifiers and as body ingredients. Cellulose esters for example could be a part of the gel and at the same time be present in the form of lumps that are bound by the gel. Resins may also be a part of the gel and at the same time be present in the form of undissolved lumps. Modifiers may include cellulose esters and ethers, rubber hydrocarbons, spinacene, squalene, waxes, pitches, polymerized oils, and factis. In addition, sodium silicate, or water glass, has been found to give good results as a modifier. Its chief purpose is to harden. When used in excess, it becomes a filler also, for it has been observed that the binding agent holds but a certain amount, and the excess separates out.

The body ingredients used with the binding medium are any substances which are suitable for use in floor coverings, for example, cork dust, wood flour, rubber, cellulose esters in plastic lump form, viscose, oxycellulose, hydrocellulose, cellulose fibers, hydrated cellulose, starch, gluten, dextrine, polymerized and vulcanized vegetable oils, pigments, and mineral fillers.

A general formula for a binding medium is as follows:

| | Parts by weight |
|---|---|
| Resinous substances | 100 |
| Plasticizers | 35 |
| Modifiers | 10 |

Dyes may be added and solvents may be used, but the use of heat to render the mass workable is desirable. Such solvents as denatured alcohol, benzol, toluol and naphtha may be used when necessary.

Specific examples of binding agents are as follows:

(1)

| | Parts by weight |
|---|---|
| Rosin | 100 |
| Dibutyl phthalate | 35 |
| Sodium silicate | 4 |
| Nitrocellulose | 4 |
| Castor oil | 2 |

A dye may be added to the plasticizer which is added to the melted resins.

(2)

| | Parts by weight |
|---|---|
| Ester gum | 50 |
| Cumaron resin | 50 |
| Dibutyl tartrate | 35 |
| Polymerized linseed oil | 10 |

(3)

| | Parts by weight |
|---|---|
| Urea formaldehyde resin | 50 |
| Cumaron resin | 25 |
| Rosin | 25 |
| Tricresyl phosphate | 20 |
| Dibutyl phthalate | 20 |

The binding mediums exemplified above are heated, and while in a softened condition are ground with the various body ingredients in proper proportions. Generally about one part of binder is used with one part of body ingredients, but these proportions are subject to variation, depending upon the degree of hardness or resiliency desired. The following is an example:

| | Parts |
|---|---|
| Wood flour, cork dust, etc. | 10–40 |
| Binding medium | 40 |
| Pigment, or filler | 40–5 |

The mixture of binding medium and body ingredients is then run between calendar rollers and by heat and pressure or pressure alone is fastened to a support, such as, burlap or a bitumen saturated felt. The drawing accompanying this application represents a cross sectional view of a floor covering which consists of a layer 1 of the above described binding agent mixed with suitable body ingredients and coloring material attached to any suitable support 2 which may or may not be impregnated with any suitable material.

The hardening or "curing" period is much shorter than that used for linoleum, only a few hours being necessary for the heated resins to harden as they are cooled. The resulting product may be used to make a product similar to inlaid linoleum or it may be used as a base upon which a decorative coat is applied. The important differences between the manufacture of the floor covering of this invention and the manufacture of linoleum, are that the binding medium in the former case is prepared by heating the resins, plasticizers and modifiers, instead of going through a laborious and complicated process of oxidizing oils and mixing with resins. Furthermore, the drying or curing process consists merely of the hardening of the resin-plasticizer composition instead of slow oxidation as in the case of an oil binding agent.

What I claim is:—

1. A floor covering consisting of a plastic composition mounted on a support, the said plastic composition including a resin, a plasticizer for the resin, and body ingredients.

2. A floor covering consisting of a plastic composition mounted on a support, the said plastic composition including a resin, a plasticizer for the resin, a modifier, and body ingredients.

3. A floor covering consisting of a plastic composition mounted on a support, the said plastic composition including a resin, diamyl phthalate, and body ingredients.

4. A floor covering consisting of a plastic composition mounted on a support, the said plastic composition including a resin, diamyl phthalate, a cellulose ester, and body ingredients.

5. A process for making a floor covering, the said process consisting in mixing body ingredients with a binding agent comprising a resin and a plasticizer for the resin, applying the resulting composition with pressure while hot, to a support, and cooling the resulting product.

6. A process for making a floor covering, the said process consisting in grinding together body ingredients, a resin, and a plasticizer for the resin, keeping the mixture hot, spreading the material over a fibrous support by means of pressure rolls, and cooling the resulting product.

7. A process for making a floor covering, the said process consisting in mixing body ingredients with a binding agent comprising a resin and a plasticizer for the resin, and by means of pressure, attaching the resulting composition, in the form of a layer, to a fibrous support.

In testimony whereof I affix my signature.

JULIAN T. BALDWIN.